(12) United States Patent
Mo et al.

(10) Patent No.: US 6,946,784 B2
(45) Date of Patent: Sep. 20, 2005

(54) ELECTRON GUN OF MONOCHROMIC CRT

(75) Inventors: Chi-Neng Mo, Chungli (TW); Pei-Kuang Lin, Taipei Hsien (TW); Yung-Wei Yang, Taipei (TW); Li-Na Chang, Taoyuan Hsien (TW)

(73) Assignee: Chunghwa Picture Tubes, Ltd., Taipei (TW)

( * ) Notice: Subject to any disclaimer, the term of this patent is extended or adjusted under 35 U.S.C. 154(b) by 0 days.

(21) Appl. No.: 10/437,081

(22) Filed: May 14, 2003

(65) Prior Publication Data

US 2004/0227448 A1 Nov. 18, 2004

(51) Int. Cl.[7] .......................... H01J 29/50; H01J 29/10
(52) U.S. Cl. ...................... 313/414; 313/409; 313/446
(58) Field of Search ................. 313/441, 495, 313/414–415, 409–412, 446–448, 348, 497; 315/14, 365

(56) References Cited

U.S. PATENT DOCUMENTS

| | | | | |
|---|---|---|---|---|
| 4,168,452 A | * | 9/1979 | Christensen et al. | 315/16 |
| 4,469,987 A | * | 9/1984 | Blacker et al. | 315/14 |
| 4,500,816 A | * | 2/1985 | Murphy | 315/368 |
| 5,382,883 A | * | 1/1995 | Chen et al. | 315/368.15 |
| 5,389,855 A | * | 2/1995 | Chen | 315/14 |
| 5,734,223 A | * | 3/1998 | Makishima et al. | 313/495 |
| 5,774,178 A | * | 6/1998 | Chern et al. | 348/206 |
| 5,814,931 A | * | 9/1998 | Makishima | 313/441 |
| 5,977,696 A | * | 11/1999 | Okamoto | 313/309 |
| 6,239,547 B1 | * | 5/2001 | Uemura et al. | 313/495 |
| 6,369,512 B1 | * | 4/2002 | Alig et al. | 315/15 |
| 6,479,937 B2 | * | 11/2002 | Chen et al. | 315/14 |

* cited by examiner

*Primary Examiner*—Karabi Guharay
*Assistant Examiner*—German Colón
(74) *Attorney, Agent, or Firm*—J.C. Patents (57) ABSTRACT

The present invention is to provide an electron gun of a monochromic CRT comprising at least two electron emission sources (e.g., cathodes) for emitting beams having a small beam spot size and being adapted to impinge on the same spot of a screen of the monochromic CRT after having been focused by a focusing lens or common lens in the electron gun. As an end, the resolution, focusing quality and brightness of the screen of the monochromic CRT are improved.

7 Claims, 7 Drawing Sheets

ELECTRON GUN OF MONOCHROMIC CRT

FIELD OF THE INVENTION

The present invention relates to CRTs (cathode-ray tubes) and more particularly to an electron gun applied to a monochromic CRT for producing better resolution, focusing quality and brightness of the monochromic CRT.

BACKGROUND OF THE INVENTION

A conventional projection television (TV) may be either a liquid crystal projection TV or CRT projection TV depending on image generations. As to the CRT projection TV, its projection can be classified as either a front projection or rear projection. The CRT projection TV comprises three monochromic CRTs for producing images of red (R), green (G), and blue (B) colors thereon respectively. The images of RGB are then amplified by a projection lens unit prior to projecting on a front or rear surface of a screen. As a result, a color image is generated on the screen as the images of RGB combined together.

Figure 1:
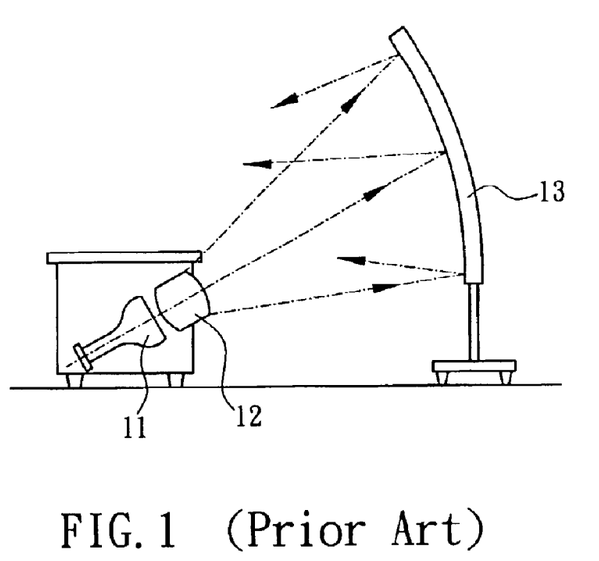
FIG. 1 schematically depicts a typical front projection type CRT projection TV.

Referring to FIG. 1, a schematic drawing of the typical front projection type CRT projection TV is shown. The lighted traces produced by each of three monochromic CRTs (consisting of a red CRT a green CRT and a blue CRT) 11 are amplified by a projection lens unit 12 prior to projecting on a reflective screen 13. The amplified lighted traces of RGB are then reflected from the reflective screen 13. As a result, a color image is generated on a TV screen for viewing as the reflected, amplified lighted traces of RGB combine.

Figure 2:
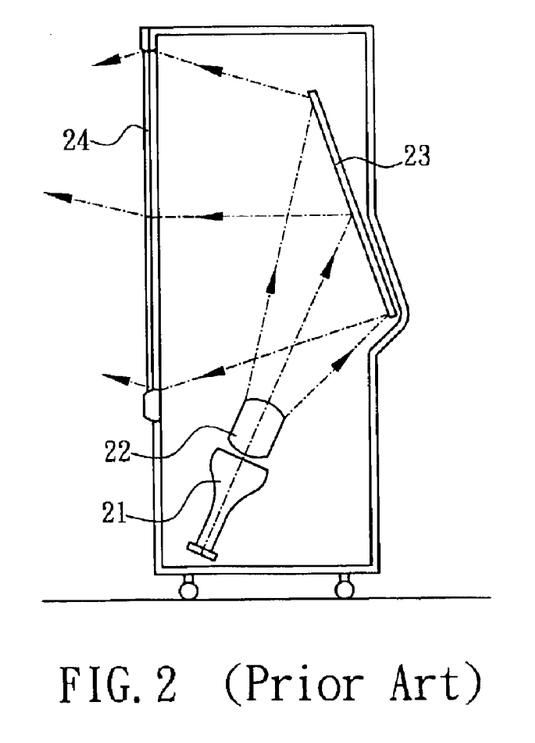
FIG. 2 schematically depicts a typical rear projection type CRT projection TV.

Referring to FIG. 2, a schematic drawing of the typical rear projection type CRT projection TV is shown. The images produced by each of R, G, and B CRTs 21 are amplified by a projection lens unit 22 prior to projecting on at least one reflective mirror 23. The amplified images of RGB are then reflected to a transmitting screen 24 from the reflective mirror 23. As a result, a color image is generated on the transmitting screen 24 for viewing as the reflected and amplified images of RGB being combined together on the big screen.

As to the typical CRT projection TV of either the front projection or the rear projection, images produced by each monochromic CRT are required to be amplified by a projection lens unit prior to projecting on a screen spaced apart from the projection lens unit by a distance. For achieving this purpose, the images produced by each monochromic CRT should have an acceptable brightness. Otherwise, energy of electrons projected from the monochromic CRT may consume considerably due to prolonged projection path of electrons and an excessive number of reflections and/or projections, resulting in a low brightness and hue of color image produced on the reflective screen 13 or the transmitting screen 24.

For solving the above problem, designers and manufacturers of typical CRT projection TVs adopt a technique of applying a large current to an electron emission source (e.g., cathode) of each monochromic CRT. As a result, beams of high energy are generated for significantly increasing brightness of image produced on the reflective screen 13 or the transmitting screen 24. Such technique can substantially solve the problem of low brightness and hue of image as experienced in the prior art. However, the prior art still suffered from a disadvantage. For example, the number of electrons in a single beam may be increased significantly due to large current applied to the single electron emission source of each monochromic CRT. However, the beam spot size will increase gradually toward the screen of each monochromic CRT due to repelling of the charges of the same polarity. To the worse, the corona may degrade significantly on the screen. An improvement of the above problem may be made by either modifying a focusing lens or common lens in an electron gun of each monochromic CRT or increasing diameter or depth of a neck portion of each monochromic CRT. However, such improvement is very limited because the diameter of the CRT made of glass is fixed according to its specifications. Therefore, it is impossible to limitless enlarge a main lens of the electron gun. As an end, an optimum beam spot size is impossible to obtain. This is why the undesired low resolution and poor focusing quality of the typical CRT projection TV of either the front projection or the rear projection cannot be improved significantly despite years research.

Thus, it is desirable to provide an improved electron gun of monochromic CRT in order to overcome the above drawbacks of the prior art.

SUMMARY OF THE INVENTION

A primary object of the present invention is to provide an electron gun of a monochromic CRT. A plurality of electron emission sources of the electron gun are adapted to emit beams having a small beam spot size. The beams then impinge on the same spot of a screen of the monochromic CRT. The present invention can increase resolution and focusing quality of the monochromic CRT.

One object of the present invention is to provide an electron gun of a monochromic CRT, the electron gun comprising at least two electron emission sources (e.g., cathodes) for emitting beams. The beams emitted from each of the electron emission sources have a small beam spot size and are adapted to impinge on the same spot of a screen of the monochromic CRT after having been focused by a focusing lens or common lens in the electron gun. As an end, both resolution and focusing quality of the monochromic CRT are improved. By utilizing this, the present invention can substantially solve the problem of hardly decreasing beam spot size due to repelling of the charges of the same polarity as a large current is applied to a single electron emission source of the prior electron gun. Most importantly, brightness of the screen of the monochromic CRT can be increased greatly, resulting in an optimum viewing quality.

In one aspect of the present invention, a current load density per unit area of each electron emission source of the present invention is much reduced as compared with that of the single electron emission source of the prior monochromic CRT resulting in a prolonging of useful life of the electron emission sources.

The above and other objects, features and advantages of the present invention will become apparent from the following detailed description taken with the accompanying drawings.

DETAILED DESCRIPTION OF THE PREFERRED EMBODIMENTS

The invention is directed to an electron gun of monochromic CRT. The monochromic CRT is used as a projection TV picture tube for producing images of red (R), green (G), or blue (B) color on its screen. The electron gun of the monochromic CRT can be customized to have at least two electron emission sources (e.g., cathodes or nano-carbon tubes) based on the needs of TV picture tube designers or manufacturers. As such, a plurality of beams emitted by the electron emission sources have a small beam spot size. Also, beams emitted from the electron emission sources can be impinged on the same spot of the monochromic CRT's screen after having been focused by an electron lens (e.g., focusing lens or common lens depending on type of the electron gun) of the electron gun.

Figure 3:
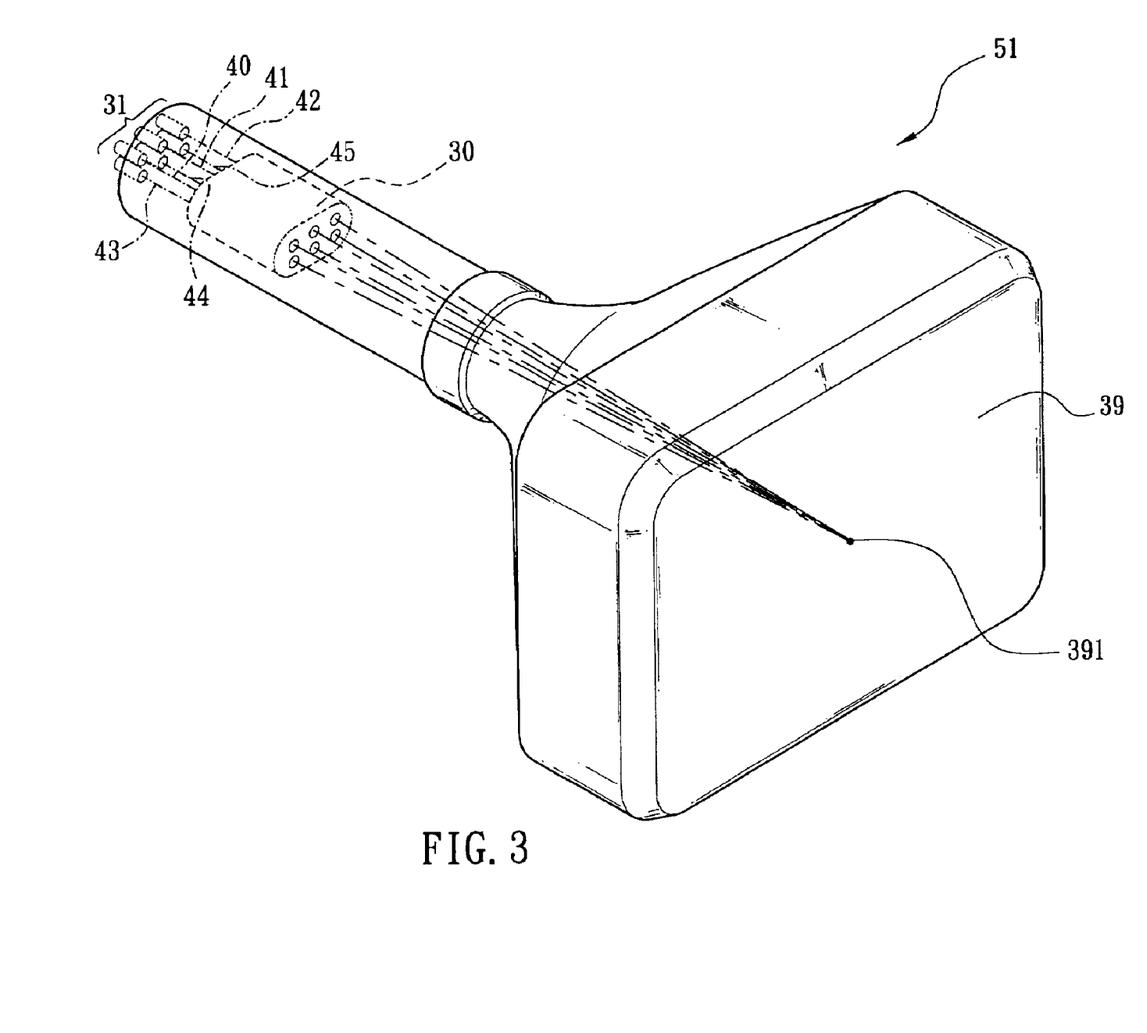
FIG. 3 is a perspective view of a monochromic CRT incorporating an electron gun having a plurality of electron emission sources arranged in a matrix according to the invention where beams emitted from the electron emission sources are impinged on the CRT's screen.
Figure 4A:
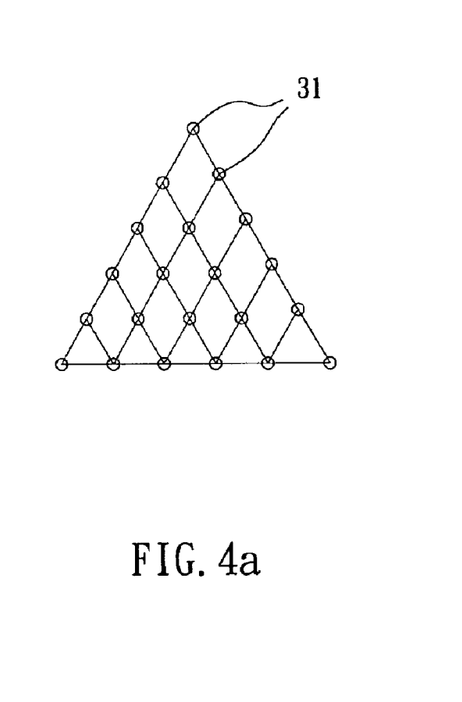
FIGS. 4a, 4b, and 4c are front views illustrating the electron emission sources arranged in other shapes.
Figure 4B:
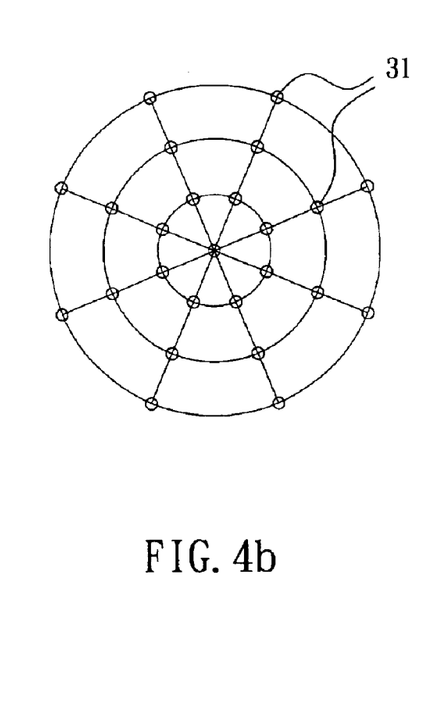
Figure 4C:
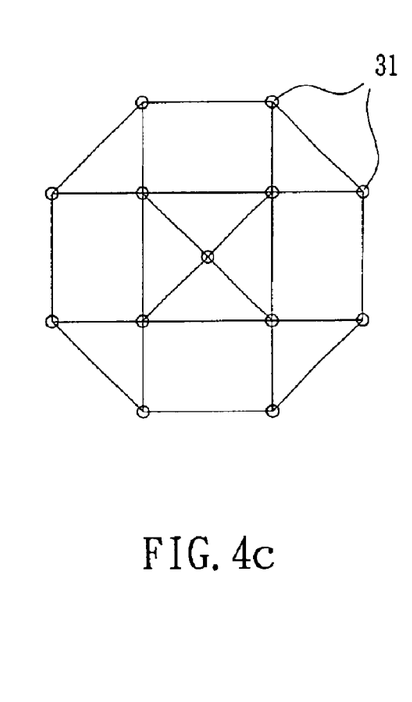

Referring to FIG. 3, an electron gun 30 of a monochromic CRT 51 comprises a plurality of electron emission sources 31 arranged in a matrix in accordance with the invention. The matrix has M columns and N rows, where each of M and N is an integer equal to or larger than 2. As shown in FIG. 3, the electron emission sources 31 are arranged as a matrix of 2 columns×3 rows. A plurality of beams 40, 41, 42, 43, 44, and 45 are emitted from the electron emission sources 31. The beams 40, 41, 42, 43, 44, and 45 are focused by an electron lens of the electron gun 30 prior to impinging on the same spot 391 of a screen 39 of the monochromic CRT 51. The invention is configured as above for replacing a prior electron emission source having a single beam. That is, the invention divides the single beam of prior electron emission source into a plurality of electron emission sources 31 arranged in a matrix of M columns×N rows. As such, a beam spot size of the plurality of beams 40, 41, 42, 43, 44, and 45 emitted by the matrix arranged electron emission sources 31 of the invention can be reduced to 1/(M×N) times of the single beam emitted by the prior used electron emission source. In other words, a small beam spot size is obtained. As such, the beams 40, 41, 42, 43, 44, and 45 can be impinged on the same spot of the screen 39 of the monochromic CRT 51 after having been focused by the focusing lens or common lens of the electron gun 30. As an end, the invention can increase resolution and focusing quality of the monochromic CRT 51. Also, the invention can substantially solve the problem of hardly decreasing beam spot size due to repelling of the charges of the same polarity as a large current is applied to the single electron emission source of the prior used electron gun.

Note that the electron emission sources 31 of the invention are not limited to the above matrix shape, i.e., equally spaced apart in both row and column directions. Other arrangements of the electron emission sources 31 are made possible by those skilled in the art without departing from the scope and spirit of the invention set forth in the claims. For example, the electron emission sources 31 can be arranged as a triangle, circle, or polygon as illustrated in FIG. 3, 4a, 4b, or 4c respectively. Further note that whether the electron emission sources 31 arranged equally spaced apart in both row and column directions or not is not critical to the invention, the plurality of electron emission sources 31 are still within the scope of the invention as long as the beams 40, 41, 42, 43, 44, and 45 emitted by the electron emission sources 31 can be impinged on the same spot 391 of the screen 39 of the monochromic CRT 51.

Figure 5A:
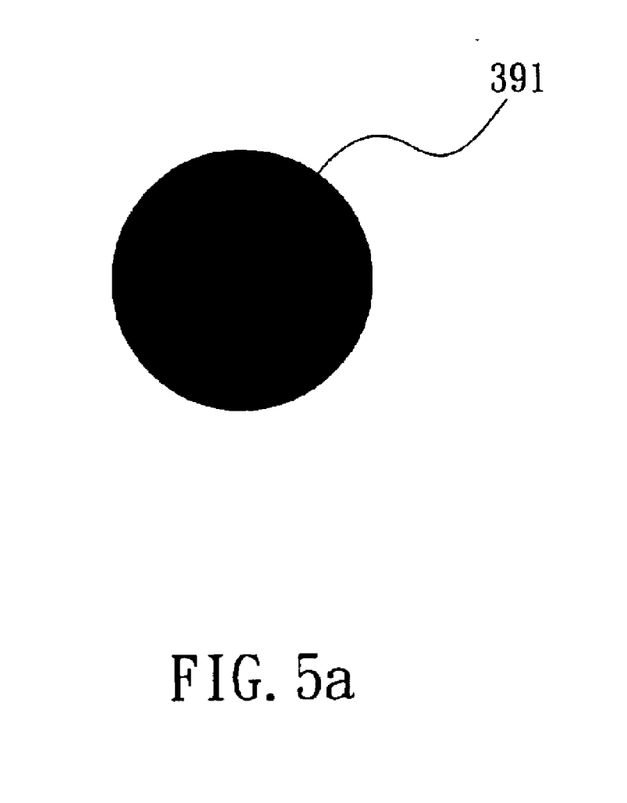
FIGS. 5a and 5b schematically depict beams emitted from the electron emission sources impinged on the same spot of the monochromic CRT's screen after having been focused by a focusing lens or common lens of the electron gun.
Figure 5B:
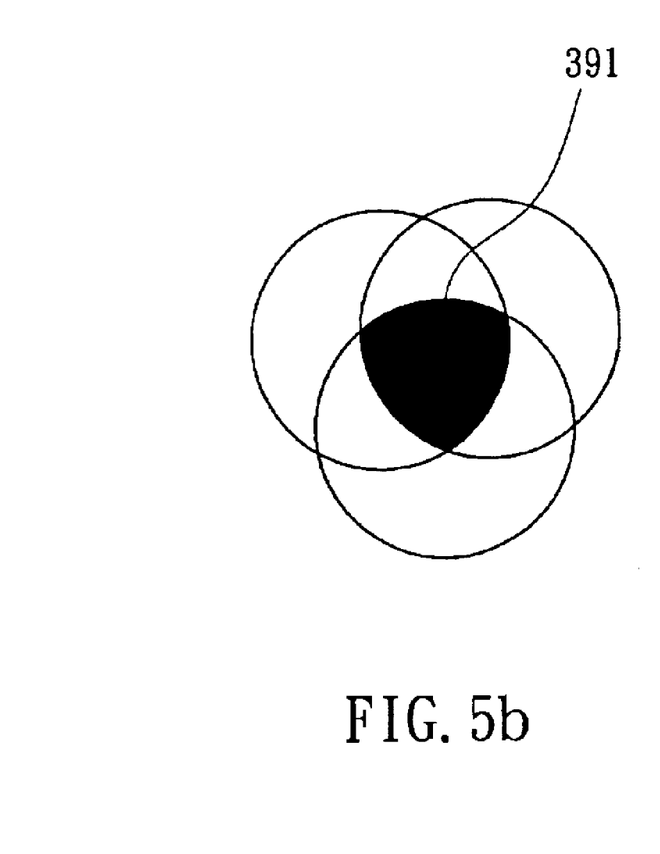

Referring to FIGS. 5a and 5b in conjunction with FIG. 3, the same spot 391 of the invention is described in detail below. The same spot 391 means that the beams 40, 41, 42, 43, 44, and 45 emitted by the electron emission sources 31 are focused on a same position of the screen 39 of the monochromic CRT 51 (see FIG. 5a). Alternatively, it means that the beams 40, 41, 42, 43, 44, and 45 are focused on a superimposed portion of three circles of the screen 39 of the monochromic CRT 51 (see FIG. 5b). Since the spot size of each of the beams 40, 41, 42, 43, 44, and 45 is greatly reduced, both the resolution and focusing quality of the monochromic CRT 51 on the focused spot are improved irrespective as to whether the beams coincide one another partially or in all parts of the spot 391. The brightness of the screen 39 of the monochromic CRT 51 can also be increased greatly because more streams of electrons are focused on a tiny spot on the screen 39.

In view of the above, the invention is particularly suitable to the applications in monochromic CRT 51 of high resolution for greatly increasing resolution of screen 39. Also, in the invention the current required by the beams 40, 41, 42, 43, 44, and 45 is much less than that of the prior art beam. As such, the current loading density per unit area of each electron emission source (e.g., cathode) can be reduced significantly. Hence, the manufacturing cost of high resolution TVs can be reduced significantly due to the elimination of expensive dispenser cathodes.

Figure 6:
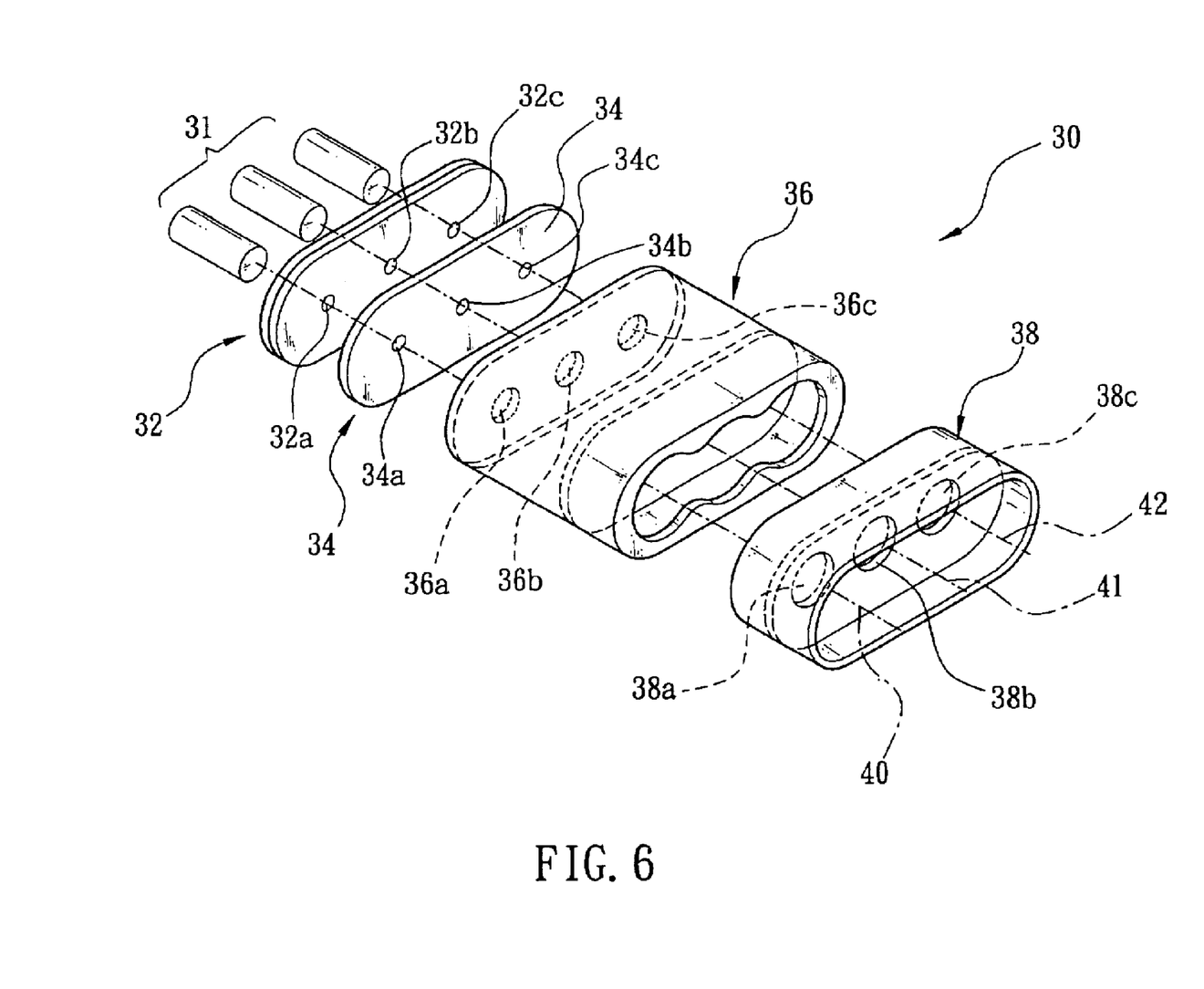
FIG. 6 is an exploded view of a preferred embodiment of electron gun according to the invention.
Figure 7:
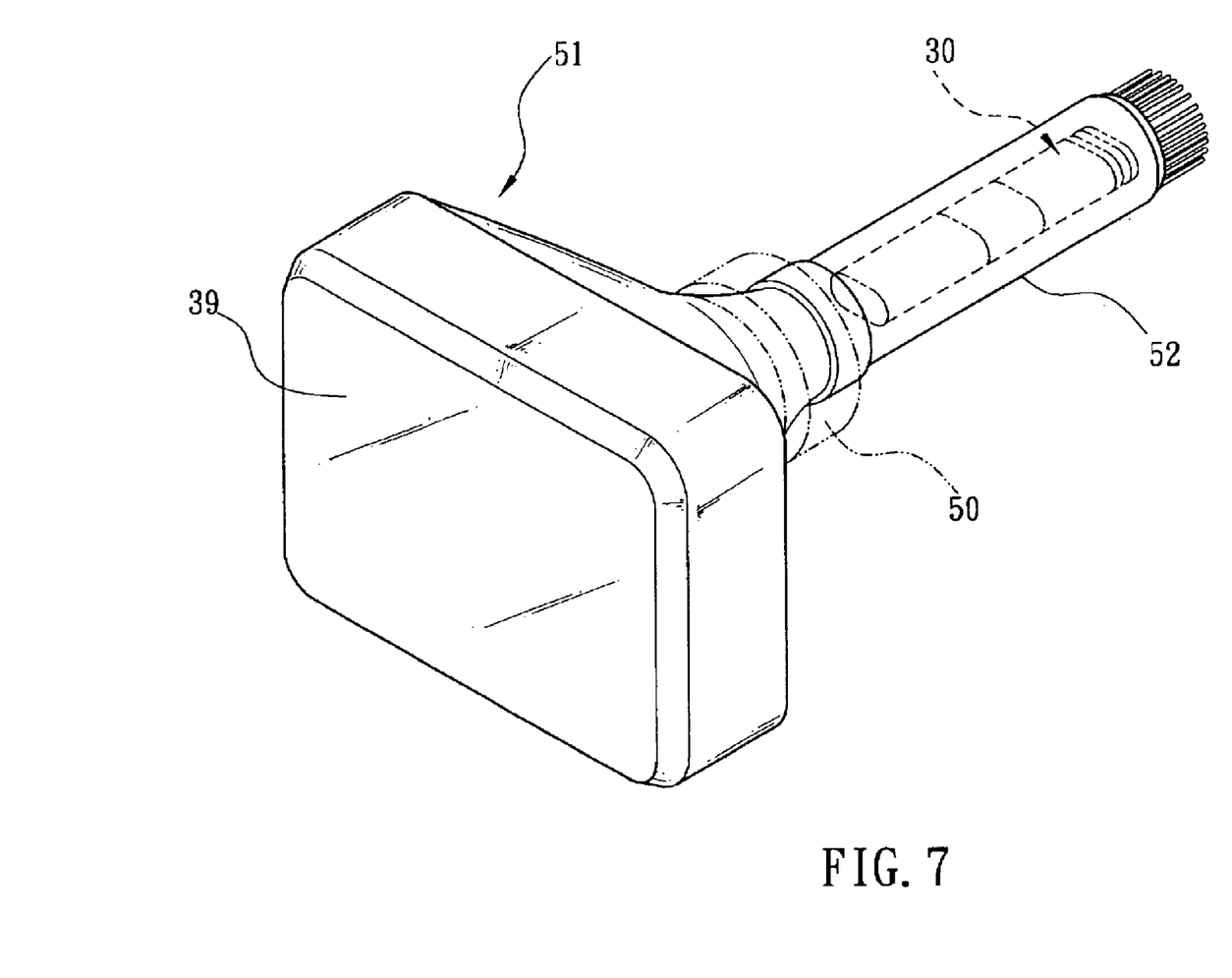
FIG. 7 is a perspective view of a monochromic CRT incorporating the electron gun shown in FIG. 6.

Referring to FIGS. 6 and 7 in conjunction with FIG. 3, in a preferred embodiment of the invention the electron gun 30 of the monochromic CRT 51 comprises a plurality of electron emission sources 31 arranged in a matrix of 3 columns×1 row. The electron emission sources 31 are able to emit three beams 40, 41, and 42 of high energy. All of the beams 40, 41, and 42 travel toward a G1 control grid 32 and an immediate G2 screen grid 34. Further, the beams 40, 41, and 42 pass apertures 32a, 32b, and 32c of the G1 control grid 32 and aligned apertures 34a, 34b, and 34c of the G2 screen grid 34 sequentially. A beam forming region (BFR) of the electron gun 30 is formed by the electron emission sources 31, the G1 control grid 32, and the G2 screen grid 34. The BFR is adapted to form a matrix of 3 columns×1 row comprised of the beams 40, 41, and 42 in the BFR as the beams are emitted by the electron emission sources 31. Next, the beams 40, 41, and 42 pass apertures 36a, 36b, and 36c of a G3 focusing electrode 36 and aligned apertures 38a, 38b, and 38c of a G4 anode 38 sequentially in which a focusing lens consists of the G3 focusing electrode 36 and the G4 anode 38. The beams 40, 41, and 42 then impinge on the same spot 391 of the screen 39 of the monochromic CRT 51 after having been focused by the focusing lens. Next, a deflection yoke 50 provided on the monochromic CRT 51 scans the whole screen 39 from left to right and from top to bottom. As an end, a monochromic image is shown on the screen 39.

In the preferred embodiment of the invention, the electron gun 30 is enclosed in a neck tube 52 of a 7-inch monochromic CRT 51 of projection TV. Referring to FIGS. 6 and 7 again, the matrix of 3 columns×1 row comprised of the beams 40, 41, and 42 formed in the BFR can be focused on same spot of the screen 39 of the monochromic CRT 51 by appropriately adjusting the deflection yoke 50 and the focusing lens. At this time, a total length of the monochromic CRT constructed in accordance with the invention is about 235 mm.

The monochromic CRT of the invention (called experiment tube hereinafter) and a 7-inch monochromic CRT having a length of 275 mm used in a typical projection TV (called prior tube hereinafter) are compared by the invention. A voltage of 32,000 volts (V) is applied to an anode of each monochromic CRT. A voltage of 400 V is applied to the G2 screen grid 34. Also, the G1 control grid 32 is electrically grounded. Data about the emission current of the electron emission sources and screen brightness measured at the electron emission sources and the screen respectively are shown in a table below.

| | type | |
|---|---|---|
| emission current ($\mu$A) | experiment tube foot lambert | prior tube foot lambert |
| 300 | 660 | 667 |
| 600 | 1178 | 1049 |
| 800 | 1475 | 1256 |
| 1000 | 1745 | 1479 |

Figure 8:
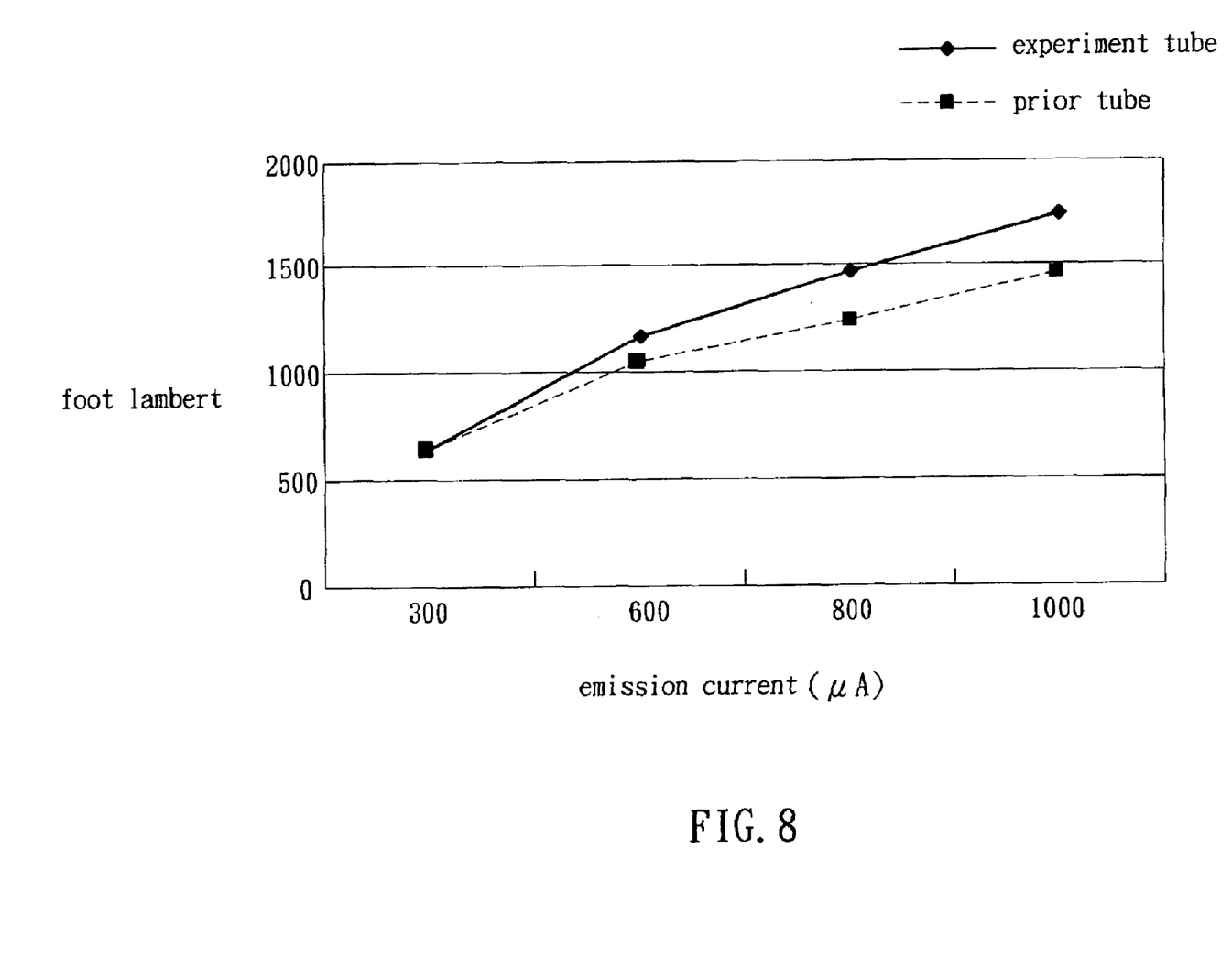
FIG. 8 is a comparison graph illustrating an emission current of the monochromic CRT in a typical projection TV and an emission current of the monochromic CRT according to the invention versus screen brightness.

Referring to FIG. 8 and the table above, it is seen that screen brightness of the experiment tube is about 18% larger than that of the prior tube when a larger current (1000 $\mu$A) is applied to the electron emission source. Also, the screen brightness of the experiment tube is about 12% larger than that of the prior tube when a normal current (600 $\mu$A) is applied to the electron emission source. Moreover, the current load density of each of the electron emission sources arranged in a 3 columns×1 row matrix is 200 $\mu$A when a total current of 600 $\mu$A is applied to the experiment tube. In other words, the current load density of each electron emission source of the invention is about one third of that of the single electron emission source of the prior tube. As such, the current load density per unit area of each electron emission source is greatly reduced, resulting in a prolonging of useful life of the electron emission sources.

While the invention has been described by means of a specific embodiment, numerous modifications and variations could be made thereto by those skilled in the art without departing from the scope and spirit of the invention set forth in the claims. For example, a monochromic CRT may incorporate any electron gun other than the one described above as long as electron emission sources of the electron gun arranged in a matrix of M columns and N rows are able to emit a plurality of beams (i.e., M×N) and the beams can be impinged on the same spot of the screen of the monochromic CRT.

What is claimed is:

1. An electron gun of a monochromic CRT, comprising:
a plurality of electron emission sources for emitting beams wherein the beams emitted from each of the electron emission sources are adapted to impinge on the same spot of a screen of the monochromic CRT alter having been focused by an electron lens in the electron gun, wherein the electron emission sources are arranged in a pattern, comprising one selected from the group consisting of:

a triangular pattern, wherein the triangular pattern including all the electron emission sources is composed of at least three triangular units; and a matrix pattern in two-dimension, wherein the matrix pattern is at least greater than a size of 3×3, has an addition point at a center, and four outmost corners are omitted.

2. The electron gun of claim 1, wherein each of the electron emission sources is a cathode.

3. The electron gun of claim 1, wherein each of the electron emission sources is a nano-carbon tube.

4. The electron gun of claim 1, wherein the electron lens is a focusing lens.

5. The electron gun of claim 1, wherein the electron lens is a common lens.

6. The electron gun of claim 1, further comprising:

a G1 control grid adjacent the electron emission sources, the G1 control grid comprising a plurality of apertures arranged in a matrix; and a G2 screen grid further away from the electron emission sources as compared with the G1 control grid, the G2 screen grid comprising a plurality of apertures arranged in a matrix and aligned with the apertures of the G1 control grid, wherein a beam forming region (BFR) of the electron gun is formed by the electron emission sources, the G1 control grid, and the G2 screen grid, the beams emitted from each of the electron emission sources pass the apertures of the G1 control grid and the apertures of the G2 screen grid sequentially, and the BFR is adapted to form a matrix comprised of the beams therein.

7. The electron gun of claim 6, further comprising:

a G3 focusing electrode further away from G1 control grid as compared with the G2 screen grid, the G3 focusing electrode comprising a plurality of apertures arranged in a matrix; and a G4 anode further away from G1 control grid as compared with the G3 focusing electrode, the G4 anode comprising a plurality of apertures arranged in a matrix and aligned with the apertures of the G3 focusing electrode, wherein a focusing lens is formed of the G3 focusing electrode and the G4 anode, the beams from the G2 screen grid pass the apertures of the G3 focusing electrode and the apertures of the G4 anode sequentially, and the beams impinge on the same spot of the screen of the monochromic CRT after having been focused by the focusing lens.

* * * * *